May 14, 1929.                J. G. ROUNTREE                1,713,398
                        COTTON HARVESTING MACHINE
                         Filed Sept. 10, 1927            2 Sheets-Sheet 1
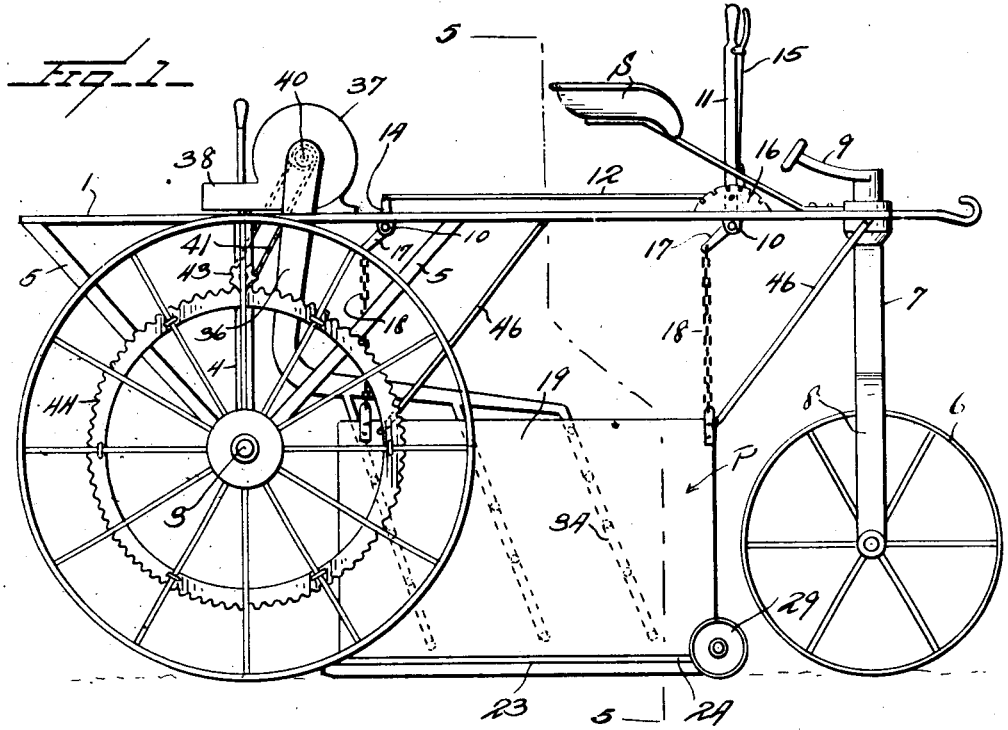
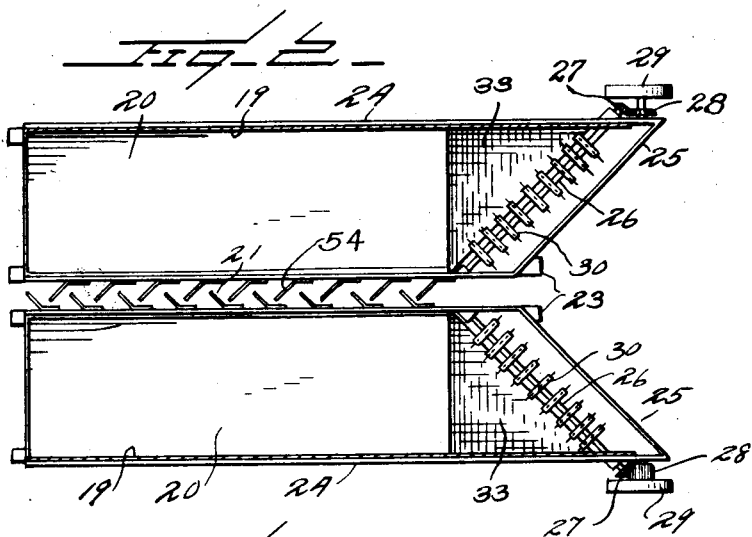
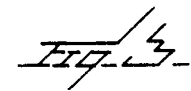
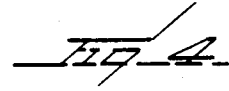
Inventor
J. G. Rountree
By Watson E. Coleman
Attorney May 14, 1929.   J. G. ROUNTREE   1,713,398
COTTON HARVESTING MACHINE
Filed Sept. 10, 1927   2 Sheets-Sheet 2
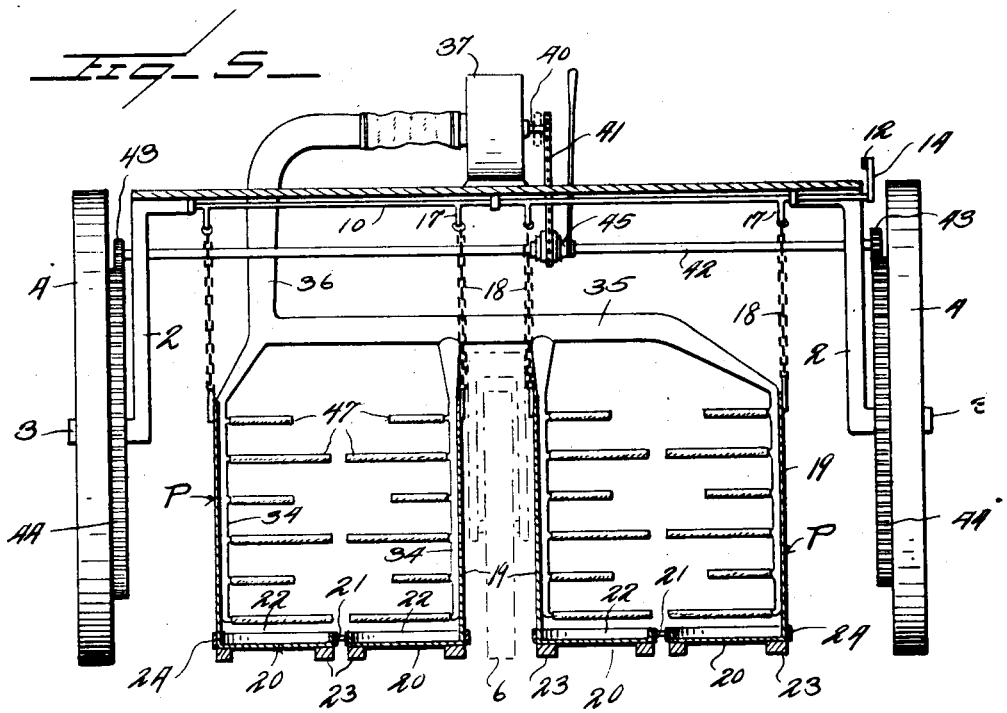
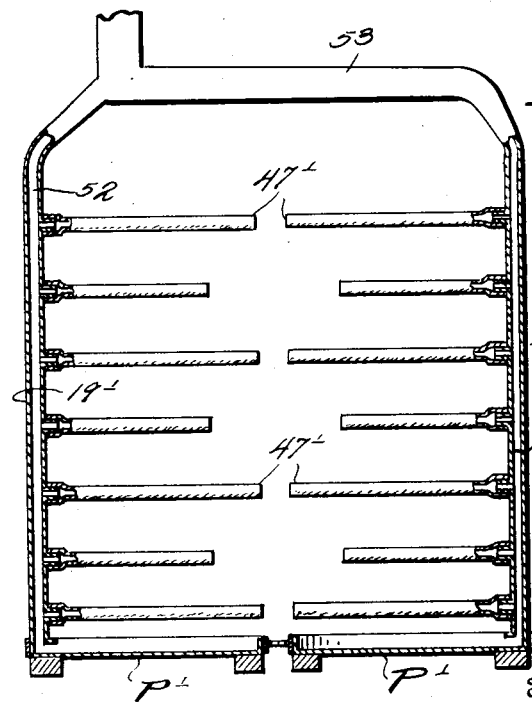
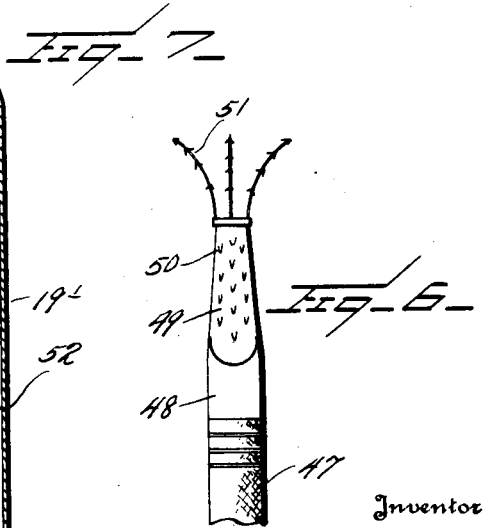
Inventor
J. G. Rountree
By Watson E. Coleman
Attorney Patented May 14, 1929.

1,713,398

UNITED STATES PATENT OFFICE.

JOSEPH G. ROUNTREE, OF BEEVILLE, TEXAS.

COTTON-HARVESTING MACHINE.

Application filed September 10, 1927. Serial No. 218,830.

This invention relates to cotton harvesting machines and it is an object of the invention to provide a device of this kind constructed in a manner whereby the cotton and bolls are effectively dislodged from the plants and gathered through a pneumatic action.

It is also an object of the invention to provide a device of this kind of a double row type and wherein the dislodged cotton and bolls are effectively gathered through pneumatic action while the machine is in transit.

An additional object of the invention is to provide a machine of this kind provided with means for harvesting the cotton together with pneumatic means for gathering such harvested cotton, said means comprising a plurality of flexible nozzles also serving as a medium for effectively agitating the plants to dislodge the cotton and bolls therefrom.

The invention consists in the details of construction and in the combination and arrangement of the several parts of my improved cotton harvesting machine whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation of a cotton harvesting machine constructed in accordance with an embodiment of my invention;

Figure 2 is an enlarged fragmentary horizontal sectional view taken through the lower portion of one set of pans with the suction tubes removed;

Figure 3 is a detailed sectional view illustrating one of the harvesting members and guard therefor;

Figure 4 is a view similar to Figure 3 illustrating a further form of harvesting member;

Figure 5 is a sectional view taken substantially on the line 5—5 of Figure 1;

Figure 6 is a fragmentary view in elevation illustrating a modified form of gathering member and nozzle;

Figure 7 is a transverse vertical sectional view illustrating a gathering structure constructed in accordance with a further embodiment of my invention.

As disclosed in the accompanying drawings, 1 denotes a platform provided at its rear portion and at the opposite sides thereof with the depending members 2 having at their lower extremities the outstanding spindles 3 on each of which is mounted a ground engaging wheel 4. Coacting with the lower portion of each of the members 2 and with the platform 1 are the reinforcing members 5, said members extending fore and aft with respect to the members 2.

The forward portion of the platform 1 at substantially its transverse center is operatively supported by a single ground engaging wheel 6 of a castor type, the standard 7 for the fork 8 of said wheel 6 projecting above the platform 1 and provided with a foot lever 9 whereby the occupant of the seat S may readily control the direction of travel of the machine when in transit. The seat S is of a conventional type supported directly upon the forward portion of the platform 1.

Rotatably supported by the platform 1 at points spaced lengthwise of the platform are the rock shafts 10 the forward one of which is provided with an upstanding operating lever 11 positioned adjacent to the seat structure S for convenient manipulation. The lever 11 is operatively connected by a rod 12 with an upstanding rock arm 14 carried by the rear shaft 10 and in parallelism therewith whereby both of the shafts 10 may be caused to rock in unison and in the same general direction upon required operation of the lever 11. The lever 11 carries a conventional latch mechanism 15 coacting with an upstanding rack 16 whereby the desired adjustments of the shafts 10 may be maintained.

The shafts 10 at requisite points thereon are provided with the rock arms 17 all disposed in the same general direction and substantially in parallelism. Secured to and depending from the outer extremities of these arms 17 are the flexible members 18, such as chains, which are also suitably fixed to the upper corner portions of the outer side walls 19 of the pans P.

The pans P are arranged in pairs and adapted to travel along the opposite sides of a plant row and include a bottom plate 20 extending inwardly from the lower marginal portion of an outer side wall 19 and is adapted to extend under the foliage of a plant row to a point closely adjacent to the stalks. The inner marginal portion of the bottom plate 20 is defined by an upstanding and relatively low side wall 21 with the rear portion of the bottom plate defined by a similar rear wall 22. Each of the bottom plates 20 at its longitudinal marginal portion has secured to the under surface thereof the runners 23 to facilitate the travel of the pan over the ground surface when in contact therewith.

Each of the pans P has secured to the lower portion thereof a frame 24 which extends in advance of the bottom plate 20 of the pan and the outer or forward end 25 of this frame 24 is disposed inwardly on a predetermined angle, preferably substantially forty-five degrees to the longitudinal axis of the pan as is particularly ilustrated in Figure 2. The extended portion of the frame 24 rotatably supports a shaft 26 substantially parallel to the outer end 25 of the frame 24 and the outer end portion of the shaft 26 is provided with a gear 27 meshing with a gear 28 carried by a ground engaging wheel 29 rotatably supported by the forward portion of the frame 24. This wheel 29 when the machine is in transit provides means for driving the shaft 26.

The shaft 26 has mounted thereon for rotation therewith a series of suitably spaced discs 30 each of which has radiating from the periphery thereof the picker fingers or teeth 31. If preferred, the discs 30 may be employed with saw-like teeth 31′ as illustrated in Figure 4.

The outer end member 25 of each of the frames 24 has secured therealong, as illustrated in Figures 3 and 4, an upstanding guard member 32 extending inwardly and partially overlying the discs 30.

The picker fingers 31 or teeth 31′ operate, as the machine advances, to pick up the cotton and cotton bolls which may be upon the ground and throw the same rearwardly upon the screen 33 arranged in each of the frames 24 in advance of the bottom wall or plate 20 of a pan P at a point closely adjacent to the discs 30 and as such cotton and bolls pass over the screen the same are effectively separated from dirt which will readily pass through the screen.

The side walls 19 of the pans are of a height to extend a material distance upwardly at each side of a plant row and disposed downwardly and forwardly along the inner face of each of the walls 19 are the pipe lines 34 in communication with a manifold 35 extending across both sets of assembled pans as illustrated in Figure 5. This manifold 35 at one end portion is in communication with a spout 36 leading to a casing 37 of a suction fan suitably mounted upon the platform 1. This casing 37 is provided with a carry-off spout 38 adapted to discharge within a suitable container or otherwise as may be preferred.

The fan within the casing 37 may be driven in any desired manner and as herein disclosed the shaft 40 of the fan is operatively connected through the medium of a chain 41 with a shaft 42 extending transversely of the machine and rotatably supported by the members 2. Each end portion of the shaft 42 has a pinion 43 meshing with a relatively large gear 44 carried by the adjacent wheel 4. The driving connection afforded by the chain 41 is under control of a conventional clutch mechanism 45.

The side walls 19 of the pans P and the platform 1 are operatively connected by the draft rods 46 as particularly illustrated in Figure 1.

Each of the pipes 34, as particularly illustrated in Figure 5, has in communication therewith and carries a plurality of flexible tubes 47, adjacent tubes being preferably of differing lengths. These tubes are adapted to come into contact with the foliage of a plant row to provide means to effectively dislodge cotton and bolls therefrom and such dislodged cotton and bolls, incident to the action of the fan within the casing 37, are drawn through such tubes 47 and pipes 34 to the casing 37 and discharged out through the carry-off spout 38.

As illustrated in Figure 6, the outer end portion of each of the tubes 47 may have engaged therewith a nozzle 48 the outer portion of which has flat faces 49 provided with outstanding angularly disposed burrs or prongs 50 with the outer end portion of the nozzle provided with the outwardly directed barbed resilient fingers 51. These fingers 51 together with the burrs or prongs 50 provide additional means to assure effective collection of the cotton and bolls as the machine passes along a plant row.

In the embodiment of my invention as illustrated in Figure 7, the outer side wall 19′ of each of the pans P′ is of a double type providing therebetween an air space 52 with which the tubes 47′ communicate, the spaces between the walls 19′ having leading therefrom the suction spouts 53 adapted for requisite communication with the casing of the suction fan.

The opposite side members of the frames 24 or those side members extending along the inner side walls 21 are provided with the outstanding springs 54 substantially bridging the space between said adjacent walls 21 and which provide means to prevent cotton dislodged from the plants falling on the ground.

From the foregoing description it is thought to be obvious that a cotton harvesting machine constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A harvesting machine of the class described comprising a portable body, pans supported by the body for travel below a plant row at opposite sides thereof, the outer marginal portions of the pans being provided with side walls extending a material distance upwardly of the plant row, inwardly disposed flexible tubes carried by said outer side walls for agitating the foliage of the plants, pneumatic means for creating a suction through the tubes, and a barbed nozzle carried by the outer end portion of each of the tubes.

2. A harvesting machine of the class described comprising a portable body, pans supported by the body for travel below a plant row at opposite sides thereof, the outer marginal portions of the pans being provided with side walls extending a material distance upwardly of the plant row, inwardly disposed flexible tubes carried by said outer side walls for agitating the foliage of the plants, pneumatic means for creating a suction through the tubes, a barbed nozzle carried by the outer end portion of each of the tubes, and barbed resilient fingers carried by and extending outwardly from the nozzles.

3. A harvesting machine of the class described comprising a portable body, pans supported by the body for travel below a plant row at opposite sides thereof, the outer marginal portions of the pans being provided with side walls extending a material distance upwardly of the plant row, inwardly disposed flexible tubes carried by said outer side walls for agitating the foliage of the plants, pneumatic means for creating a suction through the tubes, a rotatable gathering element supported in advance of each of the pans and extending transversely thereof, and a screening element interposed between each of said rotatable gathering elements and the adjacent pan.

In testimony whereof I hereunto affix my signature.

JOSEPH G. ROUNTREE.